(12) United States Patent
Zhou (10) Patent No.: US 11,882,583 B2
(45) Date of Patent: Jan. 23, 2024

(54) FBE DATA TRANSMISSION METHOD, APPARATUS, AND STORAGE MEDIUM

(71) Applicant: Beijing Xiaomi Mobile Software Co., Ltd., Beijing (CN)

(72) Inventor: Juejia Zhou, Beijing (CN)

(73) Assignee: Beijing Xiaomi Software Co., Ltd., Beijing (CN)

( * ) Notice: Subject to any disclaimer, the term of this patent is extended or adjusted under 35 U.S.C. 154(b) by 425 days.

(21) Appl. No.: 17/267,203

(22) PCT Filed: Aug. 10, 2018

(86) PCT No.: PCT/CN2018/100056
§ 371 (c)(1),
(2) Date: Feb. 9, 2021

(87) PCT Pub. No.: WO2020/029277
PCT Pub. Date: Feb. 13, 2020

(65) Prior Publication Data
US 2021/0307021 A1  Sep. 30, 2021

(51) Int. Cl.
*H04L 12/26* (2006.01)
*H04W 72/541* (2023.01)
(Continued)

(52) U.S. Cl.
CPC ......... *H04W 72/541* (2023.01); *H04W 24/08* (2013.01); *H04W 72/046* (2013.01); *H04W 72/0453* (2013.01); *H04W 72/1263* (2013.01)

(58) Field of Classification Search
CPC ............... H04W 72/541; H04W 24/08; H04W 72/0453; H04W 72/046; H04W 72/1263;
(Continued)

(56) References Cited

U.S. PATENT DOCUMENTS

| 7,039,441 B1 | 5/2006 | Reudink et al. |
| 2004/0235527 A1 | 11/2004 | Reudink et al. |
(Continued)

FOREIGN PATENT DOCUMENTS

| CN | 101877853 A | 11/2010 |
| CN | 102014504 A | 4/2011 |
(Continued)

OTHER PUBLICATIONS

International Search Report dated Apr. 25, 2019 in PCT/CN2018/100056 filed on Aug. 10, 2018, 2 pages.
(Continued)

*Primary Examiner* — Thai D Hoang
(74) *Attorney, Agent, or Firm* — Oblon, McClelland, Maier & Neustadt, L.L.P.

(57) ABSTRACT

Aspects of the disclosure can provide a data transmission method implemented by a second access network device that can include receiving transmission status indication information sent by a first access network device. The transmission status indication information includes beam occupation information and cycle occupation information. The method can further include determining a second beam having a mutually exclusive interference relationship with the first beam, determining, when the second access network device needs to perform transmission of second data with a second terminal by using the second beam, a fixed cycle occupied by the second data based on the fixed cycle occupied by the first data, and performing transmission of the second data with the second terminal in the fixed cycle occupied by the second data.

20 Claims, 4 Drawing Sheets

(51) Int. Cl.
*H04W 24/08* (2009.01)
*H04W 72/0453* (2023.01)
*H04W 72/044* (2023.01)
*H04W 72/1263* (2023.01)

(58) Field of Classification Search
CPC ..... H04W 16/14; H04W 16/28; H04W 74/04; H04B 7/0695; H04B 7/024
See application file for complete search history.

(56) References Cited

U.S. PATENT DOCUMENTS

| | | |
|---|---|---|
| 2015/0016434 A1 | 1/2015 | Lou et al. |
| 2017/0339588 A1 | 11/2017 | Moon et al. |
| 2018/0027580 A1 | 1/2018 | Yoo et al. |
| 2020/0322988 A1* | 10/2020 | Fisher-Jeffes ......... H04W 16/14 |

FOREIGN PATENT DOCUMENTS

| | | | | |
|---|---|---|---|---|
| CN | 107079455 A | | 8/2017 | |
| CN | 107113873 A | | 8/2017 | |
| CN | 107734663 A | * | 2/2018 | ............ H04W 16/28 |
| CN | 107947908 A | * | 4/2018 | ............ H04L 1/0027 |
| CN | 108024363 A | * | 5/2018 | ............ H04B 17/336 |
| WO | WO 2015/135139 A1 | | 9/2015 | |

OTHER PUBLICATIONS

Extended European Search Report dated Mar. 11, 2022 in European Patent Application No. 18929763.3, 9 pages.
Combined Chinese Office Action and Search Report dated Apr. 6, 2022 in Chinese Patent Application No. 201880001003.3 (with English translation), 14 pages.
Combined Chinese Office Action and Search Report dated Sep. 28, 2021 in Patent Application No. 201880001003.3 (with English language translation and English translation of Category of Cited Documents), 15 pages.

* cited by examiner

FBE DATA TRANSMISSION METHOD, APPARATUS, AND STORAGE MEDIUM

CROSS-REFERENCE TO RELATED APPLICATION

This application is the 371 application of PCT Application No. PCT/CN2018/100056, filed Aug. 10, 2018, the entire contents of which are incorporated herein by reference.

TECHNICAL FIELD

The application relates to the field of communication technology including to a method, an apparatus, and a storage medium for data transmission under the mechanism of FBE (Frame Based Equipment).

BACKGROUND

For the use of unlicensed frequency bands, LBT (Listen before talk) for unlicensed frequency bands has been introduced in order to achieve harmonious coexistence with Wi-Fi and other operators' LAA (Licensed-Assisted Access) networks, and reduce mutual interference. LBT defines two types of equipment, one is FBE, and the other is LBE (Load Based Equipment). For the FBE, a cycle is configured, and a channel detection is performed at a fixed position in each cycle. For example, a CCA (Clear Channel Assessment) detection is performed within each CCA detection time. If the channel state is detected as idle, the channel can be occupied for transmission. If the channel state is detected as non-idle, the equipment cannot occupy the channel during this cycle, and waits until the fixed position in the next cycle to continue detection.

If CCA is performed for interference detection in each cycle, it will bring a large processing overhead to the equipment, and the success rate of channel access cannot be guaranteed.

SUMMARY

The embodiments of the disclosure provide a method, an apparatus, and a storage medium for data transmission under the mechanism of FBE, which can save the processing overhead of the equipment and improve the success rate of channel accessing. The technical solution is as follows.

According to a first aspect of the disclosure, there is provided a data transmission method for FBE that can include receiving, by a second access network device, transmission status indication information sent by a first access network device. The transmission status indication information includes beam occupation information and cycle occupation information. The beam occupation information is used for indicating a first beam occupied for transmitting first data between the first access network device and a first terminal, and the cycle occupation information is used for indicating a fixed cycle occupied for transmitting the first data. The method can further include determining, by the second access network device, a second beam having a mutually exclusive interference relationship with the first beam, determining, by the second access network device when the second access network device needs to perform transmission of second data with a second terminal by using the second beam, a fixed cycle occupied by the second data based on the fixed cycle occupied by the first data and performing, by the second access network device, transmission of the second data with the second terminal in the fixed cycle occupied by the second data.

Optionally, the determining, by the second access network device, the fixed cycle occupied by the second data based on the fixed cycle occupied by the first data can include selecting, by the second access network device, a fixed cycle not overlapping with the fixed cycle occupied by the first data as the fixed cycle occupied by the second data.

Optionally, the determining, by the second access network device, the fixed cycle occupied by the second data based on the fixed cycle occupied by the first data can include selecting, by the second access network device for uplink data in the second data, a fixed cycle meeting a first condition as the fixed cycle occupied by the uplink data in the second data, the first condition including that there is no overlap with the fixed cycle occupied by the first data, and selecting, by the second access network device for downlink data in the second data, a fixed cycle meeting a second condition as the fixed cycle occupied by the downlink data in the second data, the second condition including that there is no overlap with a fixed cycle occupied by uplink data in the first data.

Optionally, the method can further include selecting, by the second access network device when the second data belongs to a specified type of service data and needs to occupy a conflict fixed cycle for transmission, in the conflict fixed cycle a frequency domain resource, without overlapping a frequency domain resource occupied by the first data, for transmission of the second data. The conflict fixed cycle refers to a fixed cycle having an interference conflict with the fixed cycle occupied by the first data.

Optionally, the transmission status indication information further includes FBE indication information, and the FBE indication information is used for indicating a scheduling mechanism used by the first access network device for transmission of the first data is an FBE scheduling mechanism.

Optionally, the transmission status indication information further includes frequency domain indication information, and the frequency domain indication information is used for indicating a frequency domain resource occupied by transmission of the first data. Additionally, the transmission status indication information can further include transmission type indication information, and the transmission type indication information is used for indicating a transmission type corresponding to the first data, the transmission type including uplink transmission or downlink transmission.

The method can further includes performing, by the second access network device when the transmission type corresponding to the first data includes the uplink transmission, the determining of the second beam having the mutually exclusive interference relationship with the first beam.

Optionally, the determining, by the second access network device, the second beam having the mutually exclusive interference relationship with the first beam can include determining, by the second access network device, the second beam having the mutually exclusive interference relationship with the first beam according to pre-stored mutually exclusive interference information. The mutually exclusive interference information includes a mutually exclusive interference relationship among at least one group of beams.

Optionally, the method can further include receiving, by the second access network device when measurement signal is sent by the first access network device using a first target beam, the measurement signal by using a second target beam, and obtaining a received signal strength of the measurement signal, determining, by the second access network device when the received signal strength of the measurement signal is greater than a preset threshold, there is the mutually exclusive interference relationship between the second target beam and the first target beam, and recording, by the second access network device, the mutually exclusive interference relationship between the second target beam and the first target beam.

Optionally, the method further includes determining, according to at least one group of beams determined as having the mutually exclusive interference relationship, a beam distribution of the second access network device, and a beam distribution of the first access network device, at least one group of other beams having the mutually exclusive interference relationship between the second access network device and the first access network device.

According to a second aspect of the disclosure, there is provided a data transmission apparatus for FBE, being applied to a second access network device. The apparatus can include a receiving module that is configured to receive transmission status indication information sent by a first access network device, wherein the transmission status indication information includes beam occupation information and cycle occupation information, the beam occupation information is used for indicating a first beam occupied for transmitting first data between the first access network device and a first terminal, and the cycle occupation information is used for indicating a fixed cycle occupied for transmitting the first data. The apparatus can further include a first determining module that is configured to determine a second beam having a mutually exclusive interference relationship with the first beam, a second determining module that is configured to determine, when the second access network device needs to perform transmission of second data with a second terminal by using the second beam, a fixed cycle occupied by the second data based on the fixed cycle occupied by the first data, and a transmission module that is configured to perform transmission of the second data with the second terminal in the fixed cycle occupied by the second data.

Optionally, the second determining module can be further configured to select a fixed cycle not overlapping with the fixed cycle occupied by the first data as the fixed cycle occupied by the second data. Additionally, the second determining module can be further configured to select, for uplink data in the second data, a fixed cycle meeting a first condition as the fixed cycle occupied by the uplink data in the second data, the first condition including that there is no overlap with the fixed cycle occupied by the first data, and select, for downlink data in the second data, a fixed cycle meeting a second condition as the fixed cycle occupied by the downlink data in the second data, the second condition including that there is no overlap with a fixed cycle occupied by uplink data in the first data.

Optionally, the apparatus can further include a frequency domain selection module that is configured to select, when the second data belongs to a specified type of service data and needs to occupy a conflict fixed cycle for transmission, in the conflict fixed cycle a frequency domain resource, without overlapping a frequency domain resource occupied by the first data, for transmission of the second data. The conflict fixed cycle refers to a fixed cycle having an interference conflict with the fixed cycle occupied by the first data.

The transmission status indication information can further include FBE indication information, and the FBE indication information is used for indicating a scheduling mechanism used by the first access network device for transmission of the first data is an FBE scheduling mechanism.

Optionally, the transmission status indication information further includes frequency domain indication information, and the frequency domain indication information is used for indicating a frequency domain resource occupied by transmission of the first data. Additionally, the transmission status indication information can further include transmission type indication information, and the transmission type indication information is used for indicating a transmission type corresponding to the first data, the transmission type including uplink transmission or downlink transmission.

Optionally, the first determining module is further configured to, when the transmission type corresponding to the first data includes the uplink transmission, determine the second beam having the mutually exclusive interference relationship with the first beam, Additionally, the first determining module can be further configured to determine the second beam having the mutually exclusive interference relationship with the first beam according to pre-stored mutually exclusive interference information. The mutually exclusive interference information includes a mutually exclusive interference relationship among at least one group of beams.

The apparatus can further include a measurement recoding module that is configured to receive, when measurement signal is sent by the first access network device using a first target beam, the measurement signal by using a second target beam, and obtain a received signal strength of the measurement signal, determine, when the received signal strength of the measurement signal is greater than a preset threshold, there is the mutually exclusive interference relationship between the second target beam and the first target beam, and record the mutually exclusive interference relationship between the second target beam and the first target beam.

Optionally, the measurement recoding module is further configured to determine, according to at least one group of beams determined as having the mutually exclusive interference relationship, a beam distribution of the second access network device, and a beam distribution of the first access network device, at least one group of other beams having the mutually exclusive interference relationship between the second access network device and the first access network device.

According to a third aspect of the disclosure, there is provided a data transmission device for FBE, being applied to a second access network device and including a processor and a memory configured to store instructions executable by the processor. The processor is configured to receive transmission status indication information sent by a first access network device. The transmission status indication information includes beam occupation information and cycle occupation information, the beam occupation information is used for indicating a first beam occupied for transmitting first data between the first access network device and a first terminal, and the cycle occupation information is used for indicating a fixed cycle occupied for transmitting the first data. The processor can be further configured to determine a second beam having a mutually exclusive interference relationship with the first beam, determine, when the second access network device needs to perform transmission of second data with a second terminal by using the second beam, a fixed cycle occupied by the second data based on the fixed cycle occupied by the first data, and perform transmission of the second data with the second terminal in the fixed cycle occupied by the second data.

According to a fourth aspect of the disclosure, there is provided a non-transitory computer-readable storage medium, configured to store a computer program thereon, wherein the computer program, when being executed by a processor, is used for implementing the method according to the first aspect.

The technical solution provided by the embodiments of the disclosure provide beneficial effects. For example, the access network device obtains beam occupation information and cycle occupation information of its neighboring access network device. Accordingly, when there is a need to transmit data using beams with mutually exclusive interference, the fixed cycle occupied by the data that needs to be transmitted can be determined according to the fixed cycle occupied by the neighboring access network device for data transmission, so as to selectively determine a fixed cycle without transmission interference for data transmission. Compared to repeated interference detection through CCA in each cycle, the technical solution provided in the embodiments of the disclosure can avoid interference in cycle selection, thereby reducing the processing overhead caused by CCA, and improving the success rate of channel accessing.

It should be understood that the above general description and the following detailed description are merely exemplary and explanatory, and should not limit the disclosure.

BRIEF DESCRIPTION OF THE DRAWINGS

The drawings herein are incorporated in and constitute a part of the specification, illustrate exemplary embodiments consistent with the disclosure, and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of devices and methods consistent with some aspects of the disclosure, as detailed in the appended claims.

Figure 1:
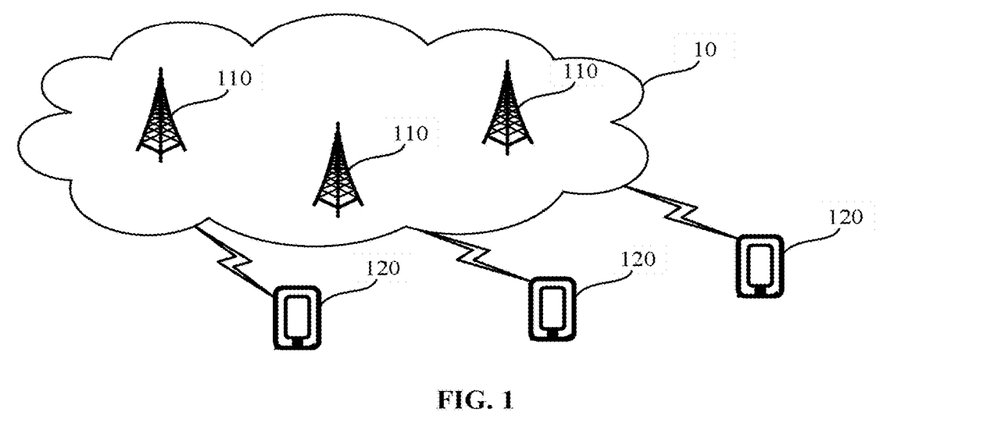
FIG. 1 is a schematic diagram illustrating a network architecture according to an exemplary embodiment.

FIG. 1 is a schematic diagram illustrating a network architecture according to an exemplary embodiment. The network architecture may include multiple access network devices 110 and terminals 120. Each access network device 110 is deployed in a RAN (Radio Access Network) 10.

The number of terminals 120 is usually multiple, and one or more terminals 120 may be distributed in a cell managed by each access network device 110.

The access network device 110 and the terminal 120 communicate with each other through some air interface technology, for example, they can communicate with each other through cellular technology. The technical solutions described in the embodiments of the disclosure can be applied to the LTE system, as well as subsequent evolution systems of the LTE system, such as the LTE-A (LTE-Advanced) system, and 5G system which is also known as NR (New Radio).

In the embodiments of the disclosure, the terms "network" and "system" may be used interchangeably, which can be understood by those skilled in the art.

The terminals involved in the embodiments of the disclosure may include various handheld devices, vehicle-mounted devices, wearable devices, computing devices with wireless communication functions, or other processing devices connected to a wireless modem, or various forms of user equipment (UE), mobile station (MS), terminal device and so on. For ease of description, the devices mentioned above are collectively referred to as terminals.

The access network device in the RAN involved in the embodiment of the disclosure may be a base station (BS), which is a device deployed in the RAN to provide a terminal with a wireless communication function. The base station may include various forms of macro base stations, micro base stations, relay stations, access points, and so on. In systems using different wireless access technologies, the names of devices with base station functions may be different. For example, in LTE systems, they are called evolved NodeB (eNB or eNodeB). In 3G communication systems, they are called Node B and so on. As communication technology evolves, the name "base station" may change. For ease of description, in the embodiments of the disclosure, the above-mentioned devices that provide wireless communication functions for terminals are collectively referred to as access network devices.

Figure 2:
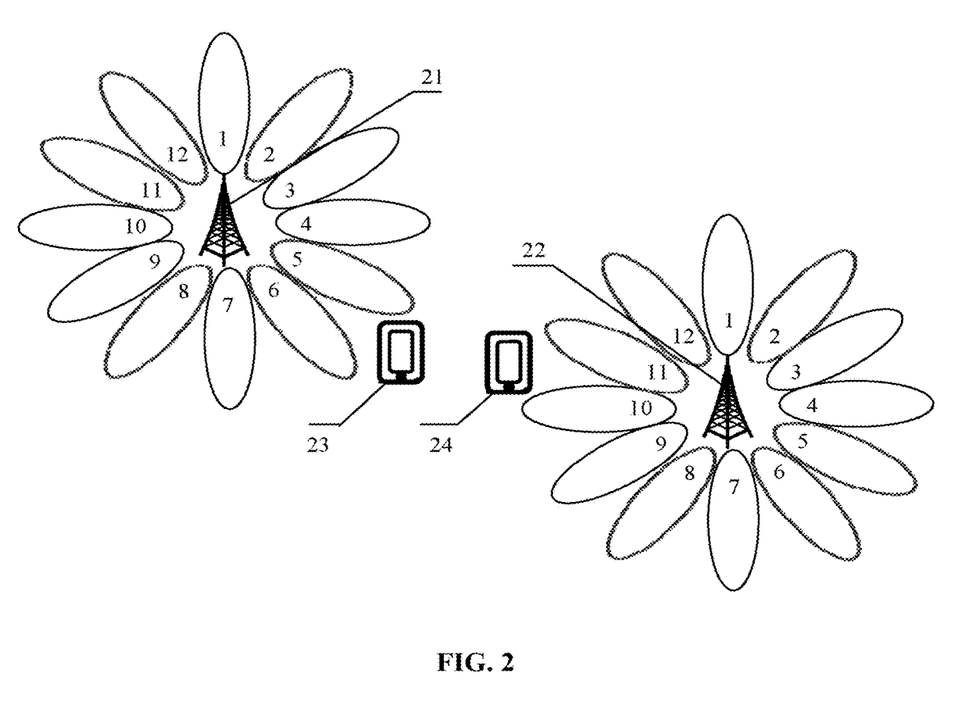
FIG. 2 is a schematic diagram illustrating an application scenario according to an exemplary embodiment.

In order to improve the transmission quality of wireless signals, beamforming technology is introduced to realize the transmission or reception of directional signals. With reference to FIG. 2, FIG. 2 is a schematic diagram illustrating an application scenario according to an exemplary embodiment. The application scenario may include: a first access network device 21, a second access network device 22, a first terminal 23, and a second terminal 24. The first terminal 23 is located in a cell served by the first access network device 21, and the second terminal 24 is located in a cell served by the second access network device 22.

As shown in FIG. 2, the first access network device 21 may include multiple antennas. The multiple antennas can generate multiple beams with different directions, covering the cell served by the first access network device 21. The first access network device 21 may send a signal to a terminal in the cell through a beam, and may also receive a signal from a terminal in the cell through a beam.

Similarly, the second access network device 22 may also include multiple antennas. The multiple antennas can generate multiple beams with different directions, covering the cells served by the second access network device 22. The second access network device 22 may send a signal to a terminal in the cell through a beam, and may also receive a signal from a terminal in the cell through a beam.

As shown in FIG. 2, when the first access network device 21 and the second access network device 22 are deployed adjacently, there may be large transmission interference among those beams of the two devices with the same or close direction. As shown in FIG. 2, it is assumed that the first access network device 21 is using the beams 5 and 6 to send downlink data to the first terminal 23, and the second access network device 22 is using the beams 10 and 11 to send downlink data to the second terminal 24. Because directions of the beams 5 and 6 and beams 10 and 11 are close to each other, the reception of the first terminal 23 may be interfered by the downlink transmission between the second access network device 22 and the second terminal 24, and the reception of the second terminal 24 may also be affected interfered by the downlink transmission between the first access network device 21 and the first terminal 23.

In addition, it is assumed that the first access network device 21 is using beams 5 and 6 to receive uplink data sent by the first terminal 23, and the second network access device 22 is using beams 10 and 11 to send downlink data to the second terminal 24, then the reception of the second terminal 24 may also be interfered by the uplink transmission between the first terminal 23 and the first access network device 21.

For LBE, if a device (terminal or access network device) performs CCA for interference detection in each cycle, a large processing overhead may be caused to the device, and the success rate of the channel accessing cannot be guaranteed.

Based on the technical solution provided by the embodiments of the disclosure, the access network device obtains beam occupation information and cycle occupation information of its neighboring access network device. Accordingly, when there is a need to transmit data using beams with mutually exclusive interference, the fixed cycle occupied by the data that needs to be transmitted can be determined according to the fixed cycle occupied by the neighboring access network device for data transmission, so as to selectively determine a fixed cycle without transmission interference for data transmission. Compared to repeated interference detection through CCA in each cycle, the technical solution provided in the embodiments of the disclosure can avoid interference in cycle selection, thereby reducing the processing overhead caused by CCA, and improving the success rate of channel accessing.

Figure 3:
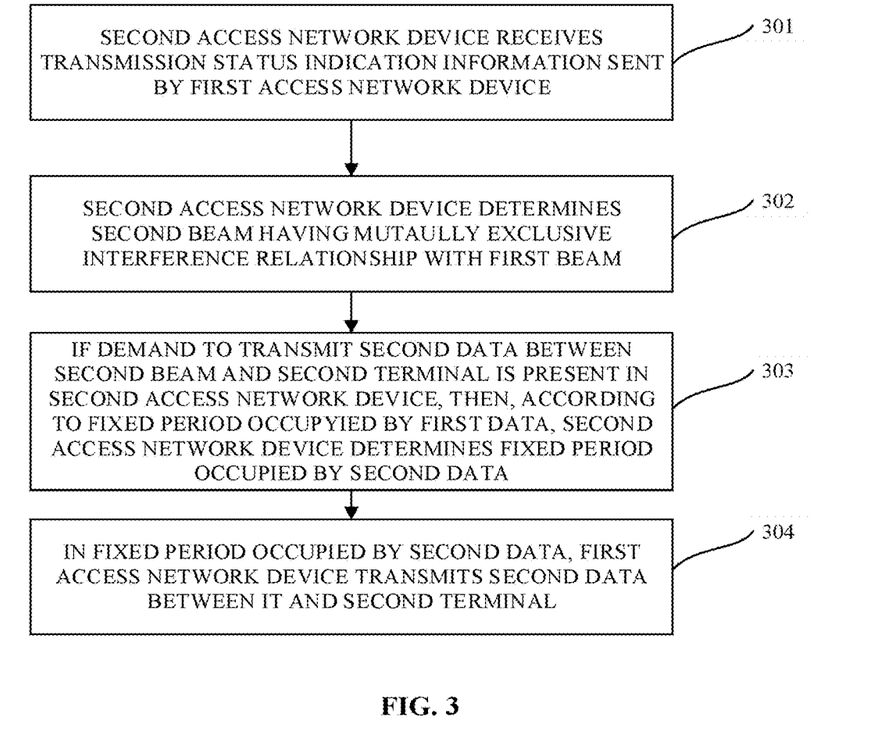
FIG. 3 is a flow chart illustrating a data transmission method for FBE according to an exemplary embodiment.

FIG. 3 is a flow chart illustrating a data transmission method for FBE according to an exemplary embodiment. This method can be applied to the application scenario shown in FIG. 2. The method may include the following steps.

In step 301, the second access network device receives transmission status indication information sent by the first access network device. The transmission status indication information is used for indicating a related transmission status when the first data is transmitted between the first access network device and the first terminal, and may include beam occupation information and cycle occupation information. The first data may include downlink data sent by the first access network device to the first terminal and/or uplink data sent by the first terminal to the first access network device.

The beam occupation information is used for indicating a first beam occupied for transmitting the first data between the first access network device and the first terminal. The number of the first beam may be one or more. The beam occupation information may include identification information of the first beam. The beam identification information is used for uniquely indicating the beam, and different beams correspond to different identification information. Optionally, the identification information of the beam includes an SSB (synchronization signal and PBCH Block) index corresponding to the beam, that is, an SSB index. For example, referring to FIG. 2, assuming that the first access network device 21 sends downlink data to the first terminal 23 through the beam 5, the beam occupation information sent by the first access network device 21 to the second access network device 22 may include identification information of beam 5.

Figure 4:
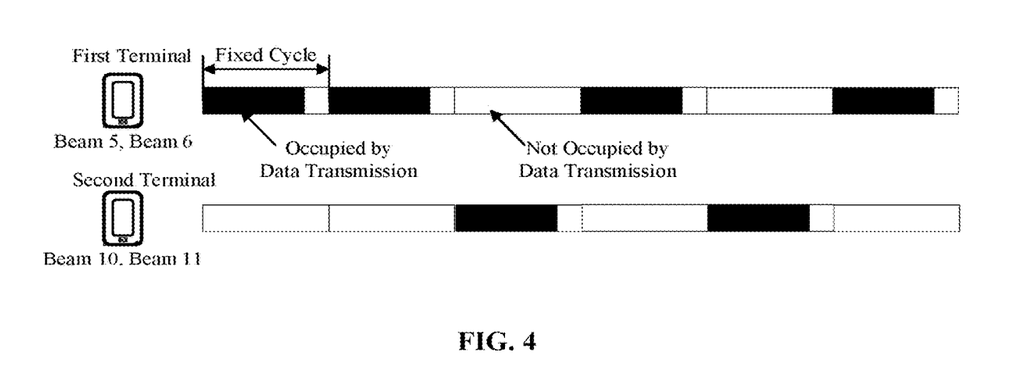
FIG. 4 exemplarily illustrates a schematic diagram of determining a fixed cycle occupied by the second data.

The cycle occupation information is used for indicating a fixed cycle occupied by transmitting the first data. The fixed cycle refers to the time-domain unit of FBE scheduling. For example, the fixed cycle may be FFP (Fixed Frame Period). The duration of the fixed cycle can be specified in advance by the protocol. The first access network device sends cycle occupation information to the second access network device to inform the second access network device of which fixed cycle or cycles it takes to transmit the first data. Exemplarily, the cycle occupation information may be represented by a bitmap. For example, 1 indicates that a fixed cycle is occupied, and 0 indicates that the fixed cycle is idle (that is, not occupied). With reference to FIG. 4, the fixed cycle occupied for transmitting the first data between the first access network device and the first terminal may be expressed as 110101, that is, the first fixed cycle, the second fixed cycle, the fourth fixed cycle, and the sixth fixed cycle are occupied by the transmission of the first data, and the third and fifth fixed cycles are not occupied by them.

Optionally, the cycle occupation information may include cycle indication information and cycle-related information; wherein the cycle indication information is used for indicating a fixed cycle occupied for transmitting the first data, and the cycle-related information is used for indicating related parameters of the fixed cycle, which may include a duration of the fixed cycle, the number of fixed cycles, the COT (Channel Occupancy Time) in the fixed cycle, and other information.

Optionally, the transmission status indication information further includes FBE indication information, which is used for indicating that a scheduling mechanism when the first access network device transmits the first data is an FBE scheduling mechanism. When the scheduling mechanism used by the first access network device for transmitting the first data is the FBE scheduling mechanism, and the scheduling mechanism used by the second access network device for transmitting the second data is also the FBE scheduling mechanism, the second access network device executes the following steps. When the scheduling mechanism used by the first access network device for transmitting the first data is not FBE, and/or, the scheduling mechanism used by the second access network device for transmitting the second data is not FBE, the second access network device does not perform the following steps but, instead, may perform a data transmission process under other corresponding mechanisms.

Optionally, the transmission status indication information further includes frequency domain indication information, wherein the frequency domain indication information is used for indicating a frequency domain resource occupied by transmitting the first data. The frequency domain resources may include identification information of frequency domain units such as CC (Component Carrier) and BWP (Bandwidth Part).

Optionally, the transmission status indication information further includes transmission type indication information, where the transmission type indication information is used for indicating a transmission type corresponding to the first data, and the transmission type includes uplink transmission or downlink transmission. Uplink transmission means that the terminal sends data to the access network device, that is, the access network device receives data from the terminal; downlink transmission means that the access network device sends data to the terminal, that is, the terminal receives data from the access network device.

The second access network device may receive the transmission status indication information sent by the first access network device through an air interface. The above air interface may be an X2 interface or an air interface equivalent to the X2 interface.

In step 302, the second access network device determines a second beam having a mutually exclusive interference relationship with the first beam.

Optionally, the second access network device may determine the second beam having the mutually exclusive interference relationship with the first beam according to pre-stored mutually exclusive interference information; wherein the mutually exclusive interference information includes mutually exclusive interference between at least one group of beams. Further, the mutually exclusive interference information corresponding to the first access network device pre-stored in the second access network device can include mutually exclusive interference between at least one set of beams of the first access network device and the second access network device. In an example, the mutually exclusive interference information may include mutually exclusive interference relationship between a group of beams with the largest interference between the second access network device and the first access network device. In another example, the mutually exclusive interference information may include all mutually exclusive interference relationships existing between the beams of the second access network device and the first access network device.

The above-mentioned mutually exclusive interference relationship can be preset when the access network device is deployed, or it can be obtained by initial measurement when the access network device is deployed.

Optionally, the initialization measurement process may be as follows. When the first access network device uses a first target beam to send a measurement signal, the second access network device uses a second target beam to receive the measurement signal, and obtains the received signal strength of the measurement signal. When the received signal strength of the measurement signal is greater than a preset threshold, the second access network device determines that the second target beam has mutually exclusive interference relationship with the first target beam. When the received signal strength of the measurement signal is less than the preset threshold, the second access network devices determines that the second target beam does not have mutually exclusive interference relationship with the first target beam. Optionally, the received signal strength can be measured by using the RSRP (Reference Signal Received Power) value. In addition, the preset threshold may be specified in advance by the protocol, or may be preset in the second access network device. If the second access network device determines that the second target beam has mutually exclusive interference relationship with the first target beam, the second access network device records the mutual exclusive interference relationship between the second target beam and the first target beam. For example, the mutually exclusive interference relationship may be recorded in the mutually exclusive interference information.

The above process is only an example in which it is determined whether there is mutually exclusive interference relationship between a group of beams. For other beams, it is possible to adopt a similar process. Optionally, with reference to FIG. 2, during the initial measurement process, the first access network device 21 sends a measurement signal using the beam 1 and the second access network device 22 turns on the beam 1 to the beam 12 one by one to receive the measurement signal sent by the first access network device 21, thereby obtaining the received signal strength of the measurement signal and completing the first round of measurement. After that, the first access network device 21 sends the measurement signal using the beam 2 and the second access network device 22 turns on the beam 1 to the beam 12 one by one in the order of the beam number to receive the measurement signal sent by the first access network device 21, thereby obtaining the received signal strength of the measurement signal and completing the second round of measurement. After that, the first access network device 21 sequentially uses the beam 3 to the beam 12 and repeats the above measurement process. At this point, an initial measurement is completed. The second access network device 22 records all sets of beams having mutually exclusive interference relationship.

In addition, the second access network device may determine, according to at least one group of beams determined as having the mutually exclusive interference relationship, a beam distribution of the second access network device, and a beam distribution of the first access network device, at least one group of other beams having the mutually exclusive interference relationship between the second access network device and the first access network device. Optionally, the above-mentioned beam distribution may include an angle of the beams and/or directions of the beams. For example, the second access network device may estimate, based on the beams determined as having the mutually exclusive interference relationship in combination with the beam distribution of the first and second access network devices, a group of beams having the same or close directions between the first and second access network devices, and determines the above-mentioned group of beams having the same or close directions as the group of beams having the mutually exclusive interference relationship. Exemplarily, referring to FIG. 2, assuming that the beam 5 of the first access network device 21 and the beam 10 of the second access network device 22 have the mutually exclusive interference relationship, according to the included angle of the beams, it can be derived that the beam 6 of the first access network device 21 and the beam 10 of the second access network device 22 may also have the mutually exclusive interference relationship.

In addition, in the embodiments of the disclosure, the recording manner of the mutually exclusive relationship between beams is not limited. Exemplarily, with reference to FIG. 2, it may be recorded in the following form. The first access network device: {beam 5}↔the second access network device: {beam 11}, which means beam 5 of the first access network device 21 and beam 11 of second access network device 22 have the mutually exclusive interference relationship. Alternatively, it may be recorded in the following form. The first access network device: {beam 5, beam 6}↔the second access network device: {beam 10, beam 11}, which means that beam 5 and/or beam 6 of the first access network device 21 and beam 10 and/or beam 11 of the second access network device 22 have the mutually exclusive interference relationship.

In step 303, if the second access network device needs to perform transmission of the second data with the second terminal by using the second beam, the second access network device determines, according to the fixed cycle occupied by the first data, a fixed cycle occupied by the second data. When the second access network device needs to perform transmission of the second data with the second terminal by using the second beam, the second access network device may schedule the fixed cycle occupied by the second data according to the fixed cycle occupied by the first data, so as to avoid transmission interference caused by the first data and the second data occupying overlapping fixed cycles.

In the following, several possible implementation manners for the second access network device to determine the fixed cycle occupied by the second data are described.

In a possible implementation manner, when the second access network device needs to perform transmission of the second data with the second terminal by using the second beam, the second access network device selects a fixed cycle not overlapping with the fixed cycle occupied by the first data as the fixed cycle occupied by the second data. Exemplarily, with reference to FIG. 4, the first access network device and the first terminal use the beam 5 or the beam 6 to transmit the first data, and the fixed cycles occupied include the first fixed cycle, the second fixed cycle, the fourth fixed cycle and the sixth fixed cycle. When the second access network device needs to perform transmission of the second data with the second terminal by using the second beam, the above four fixed cycles used for transmitting the first data cannot be scheduled to transmit the second data, other fixed cycles not occupied by the first data, that is, the third fixed cycle and the fifth fixed cycle, may be selected to transmit the second data.

In another possible implementation manner, considering that the uplink transmission may cause relatively great interfere to the transmission in the neighboring cell, while the downlink transmission may cause relatively light interfere to the transmission in the neighboring cell, the second access network device may also adopt the following manner to determine the fixed cycle occupied by the second data.

1. For the uplink data in the second data, the second access network device selects a fixed cycle that meets a first condition as the fixed cycle occupied by the uplink data in the second data; wherein the first condition includes that there is no overlap with the fixed cycle occupied by the first data. Exemplarily, with reference to FIG. 5, the first access network device and the first terminal use the beam 5 or the beam 6 to transmit the first data, and the fixed cycles occupied include the first fixed cycle, the second fixed cycle, the fourth fixed cycle and the sixth fixed cycle. Among them, in the first and fourth fixed cycles, there are downlink transmission occupation and uplink transmission occupation, while in the second and sixth fixed cycles, there is only downlink transmission occupation. When the second access network device needs to transmit the second data using the beam 10 or the beam 11, for the uplink data in the second data, the second access network device may select a fixed cycle not occupied by the first data, that is, the third fixed cycle and the fifth fixed cycle, as the fixed cycles occupied by uplink data in the second data.

2. For the downlink data in the second data, the second access network device selects a fixed cycle that meets a second condition as the fixed cycle occupied by the downlink data in the second data; wherein the second condition includes that there is no overlap with a fixed cycle occupied by uplink data in the first data. Exemplarily, with reference to FIG. 5, the first access network device and the first terminal use the beam 5 or the beam 6 to transmit the first data, and the fixed cycles occupied include the first fixed cycle, the second fixed cycle, and the fourth fixed cycle and the sixth fixed cycle. Among them, in the first and fourth fixed cycles, there are downlink transmission occupation and uplink transmission occupation, while in the second and sixth fixed cycles, there is only downlink transmission occupation. When the second access network device needs to transmit the second data using the beam 10 or the beam 11, for the downlink data in the second data, the second access network device may select the second fixed cycle and the sixth fixed cycle that have been occupied by the downlink data in the first data as fixed cycles occupied by the downlink data in the second data. Optionally, the second access network device may also select the fixed cycle not occupied by the first data, that is, the third fixed cycle and the fifth fixed cycle, as the fixed cycle occupied by the downlink data in the second data.

In this way, the utilization efficiency of the fixed cycles can be improved on the premise of avoiding transmission interference as much as possible.

Figure 5:
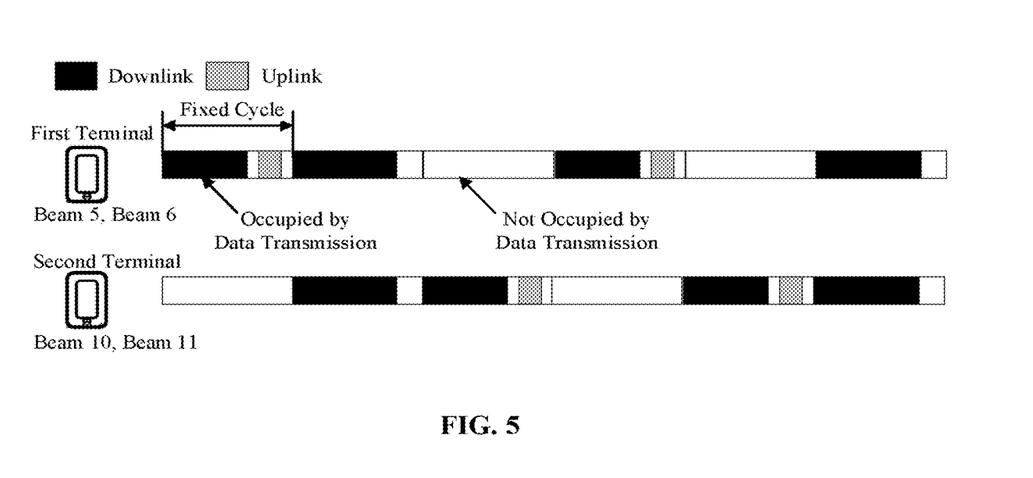
FIG. 5 exemplarily illustrates another schematic diagram of determining a fixed cycle occupied by the second data.

It should be also noted that the transmission status indication information sent by the first access network device to the second access network device may further include uplink/downlink occupation indication information, which is used for indicating the uplink/downlink occupation type corresponding to each fixed cycle occupied by the transmission of the first data. Optionally, the uplink/downlink occupation type may include uplink transmission occupation or no uplink transmission occupation. Exemplarily, the uplink/downlink occupation indication information may also be represented by a bitmap. For example, 1 indicates that there is uplink transmission occupation, and 0 indicates that there is no uplink transmission occupation. With reference to FIG. 5, the fixed cycles occupied by transmission of the first data between the first access network device and the first terminal may be expressed as 100100, that is, there is uplink transmission occupation in the first fixed cycle and the fourth fixed cycle, while there is no uplink transmission occupation in the third fixed cycle, the fifth fixed cycle, and the sixth fixed cycle.

It should be further noted that when the second data belongs to a specified type of service data and needs to occupy a conflicting fixed cycle for transmission, the second access network device may select, in the conflicting fixed cycle, a frequency domain resource without overlapping the frequency domain resource occupied by the first data for transmission of the second data. The specified type of service data may be, for example, delay-sensitive service data. The conflicting fixed cycle refers to a fixed cycle which has interference conflict with the fixed cycle occupied by the first data. The above-mentioned interference conflict may be determined based on a rule that there is overlapping between the fixed cycle occupied by the first data and the fixed cycle occupied by the second data, or that there is overlapping between the fixed cycle occupied by the uplink data in the first data and the fixed cycle occupied by the uplink data in the second data. Optionally, when the second access network device selects a frequency domain resource for transmitting the second data, the second access network device may select a frequency domain resource that is not adjacent to the frequency domain resource occupied by the first data as much as possible, so as to reduce or avoid interference therebetween.

In addition, the second access network device may perform the foregoing step 303 in the following two manner.

In a possible implementation manner, when the second access network device needs to send the second data to the second terminal by using the second beam, and when the second access network device needs to receive the second data sent from the second terminal by using the second beam, the second access network device may perform the foregoing step of determining the fixed cycle occupied by the second data according to the fixed cycle occupied by the first data.

In another possible implementation manner, when the second access network device needs to send the second data to the second terminal by using the second beam, the second access network device performs the foregoing step of determining the fixed cycle occupied by the second data according to the fixed cycle occupied by the first data. However, when the second access network device needs to use the second beam to receive the second data sent by the second terminal, the second access network device does not perform the foregoing step of determining the fixed cycle occupied by the second data according to the fixed cycle occupied by the first data. Because the transmission between the first access network device and the first terminal may cause light interference to the uplink reception of the second access network device, the second access network device may perform the above step 303 only when there is a demand for downlink transmission so as to avoid interference. But when there is a demand for uplink transmission, it is not necessary to schedule the fixed cycle occupied by the second data according to the fixed cycle occupied by the first data, and it may be considered that the second data will not be interfered by the transmission of the first data.

In step 304, the second access network device performs transmission of the second data with the second terminal in the fixed cycle occupied by the second data. After the second access network device determines the fixed cycle occupied by the second data, the second data may be transmitted by occupying the fixed cycle as determined. In addition, the second access network device may or may not perform CCA before performing transmission of the second data with the second terminal by occupying the fixed cycle as determined, which is not limited in the embodiments of the disclosure.

It should be noted that when the second access network device performs data transmission, it can also send transmission status indication information to its neighboring access network device, and its neighboring access network device can also perform data transmission under the above-mentioned FBE mechanism.

In summary, based on the technical solution provided by the embodiments of the disclosure, the access network device obtains beam occupation information and cycle occupation information of its neighboring access network device. Accordingly, when there is a need to transmit data using beams with mutually exclusive interference, the fixed cycle occupied by the data that needs to be transmitted can be determined according to the fixed cycle occupied by the neighboring access network device for data transmission, so as to selectively determine a fixed cycle without transmission interference for data transmission. Compared to repeated interference detection through CCA in each cycle, the technical solution provided in the embodiments of the disclosure can avoid interference in cycle selection, thereby reducing the processing overhead caused by CCA, and improving the success rate of channel accessing.

The following are apparatus embodiments of the disclosure and can be used to implement the method embodiments of the disclosure. For details not disclosed in the apparatus embodiments of the disclosure, refer to the method embodiments of the disclosure.

Figure 6:
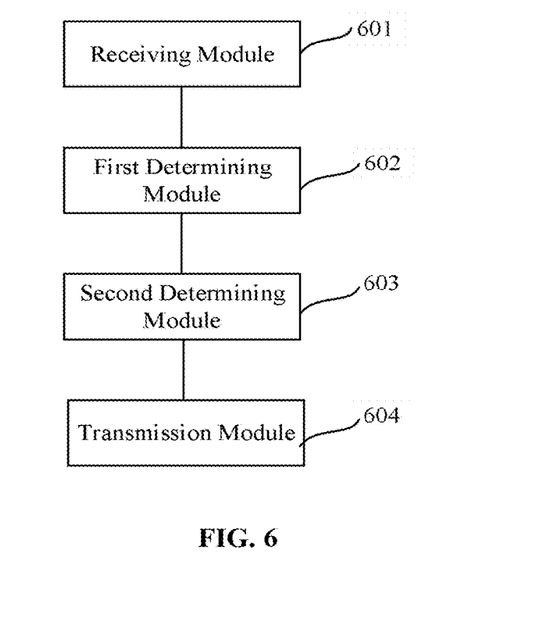
FIG. 6 is a block diagram illustrating a data transmission apparatus for FBE according to an embodiment.

FIG. 6 is a block diagram illustrating a data transmission apparatus for FBE according to an embodiment. The apparatus is provided with a function to implement the above method embodiments, and the function may be implemented by hardware, or may be implemented by hardware executing corresponding software. The apparatus may be applied to the second access network device described above. The apparatus may include a receiving module 601, a first determining module 602, a second determining module 603, and a transmission module 604. Of course, it should be understood that one or more of the modules described in this disclosure can be implemented by hardware, such as circuitry.

The receiving module 601 is configured to receive transmission status indication information sent by a first access network device, wherein the transmission status indication information includes beam occupation information and cycle occupation information, the beam occupation information is used for indicating a first beam occupied for transmitting first data between the first access network device and a first terminal, and the cycle occupation information is used for indicating a fixed cycle occupied for transmitting the first data.

The first determining module 602 is configured to determine a second beam having a mutually exclusive interference relationship with the first beam.

The second determining module 603 is configured to determine, when there is a need to perform transmission of second data with a second terminal by using the second beam, a fixed cycle occupied by the second data based on the fixed cycle occupied by the first data.

The transmission module 604 is configured to perform transmission of the second data with the second terminal in the fixed cycle occupied by the second data.

In summary, based on the technical solution provided by the embodiments of the disclosure, the access network device obtains beam occupation information and cycle occupation information of its neighboring access network device. Accordingly, when there is a need to transmit data using beams with mutually exclusive interference, the fixed cycle occupied by the data that needs to be transmitted can be determined according to the fixed cycle occupied by the neighboring access network device for data transmission, so as to selectively determine a fixed cycle without transmission interference for data transmission. Compared to repeated interference detection through CCA in each cycle, the technical solution provided in the embodiments of the disclosure can avoid interference in cycle selection, thereby reducing the processing overhead caused by CCA, and improving the success rate of channel accessing.

In an optional embodiment provided based on the embodiment of FIG. 6, the second determining module 603 is configured to select a fixed cycle not overlapping with the fixed cycle occupied by the first data as the fixed cycle occupied by the second data.

In another optional embodiment provided based on the embodiment of FIG. 6, the second determining module 603 can be configured to select, for uplink data in the second data, a fixed cycle meeting a first condition as the fixed cycle occupied by the uplink data in the second data, the first condition including that there is no overlap with the fixed cycle occupied by the first data, and select, for downlink data in the second data, a fixed cycle meeting a second condition as the fixed cycle occupied by the downlink data in the second data, the second condition including that there is no overlap with a fixed cycle occupied by uplink data in the first data.

In another optional embodiment provided based on the embodiment of FIG. 6 or the foregoing optional embodiments, the apparatus can further include a frequency domain selection module that is configured to select, when the second data belongs to a specified type of service data and needs to occupy a conflict fixed cycle for transmission, in the conflict fixed cycle a frequency domain resource, without overlapping a frequency domain resource occupied by the first data, for transmission of the second data. The conflict fixed cycle refers to a fixed cycle having an interference conflict with the fixed cycle occupied by the first data.

In another optional embodiment provided based on the embodiment of FIG. 6 or the foregoing optional embodiments, the transmission status indication information further includes FBE indication information, and the FBE indication information is used for indicating a scheduling mechanism used by the first access network device for transmission of the first data is an FBE scheduling mechanism.

In another optional embodiment provided based on the embodiment of FIG. 6 or the foregoing optional embodiments, the transmission status indication information further includes frequency domain indication information, and the frequency domain indication information is used for indicating a frequency domain resource occupied by transmission of the first data.

In another optional embodiment provided based on the embodiment of FIG. 6 or the foregoing optional embodiments, the transmission status indication information further includes transmission type indication information, and the transmission type indication information is used for indicating a transmission type corresponding to the first data, the transmission type including uplink transmission or downlink transmission.

Optionally, the first determining module 602 is further configured to, when the transmission type corresponding to the first data includes the uplink transmission, determine the second beam having the mutually exclusive interference relationship with the first beam.

In another optional embodiment provided based on the embodiment of FIG. 6 or the foregoing optional embodiments, the first determining module 602 is configured to determine the second beam having the mutually exclusive interference relationship with the first beam according to pre-stored mutually exclusive interference information; wherein the mutually exclusive interference information includes a mutually exclusive interference relationship among at least one group of beams.

In another optional embodiment provided based on the embodiment of FIG. 6 or the foregoing optional embodiments, the apparatus further includes a measurement recording module that can be configured to receive, when measurement signal is sent by the first access network device using a first target beam, the measurement signal by using a second target beam, and obtain a received signal strength of the measurement signal, determine, when the received signal strength of the measurement signal is greater than a preset threshold, there is the mutually exclusive interference relationship between the second target beam and the first target beam, and record the mutually exclusive interference relationship between the second target beam and the first target beam.

Optionally, the measurement recording module can be further configured to determine, according to at least one group of beams determined as having the mutually exclusive interference relationship, a beam distribution of the second access network device, and a beam distribution of the first access network device, at least one group of other beams having the mutually exclusive interference relationship between the second access network device and the first access network device.

It should be noted that when the apparatus provided by the above embodiment implements its function, the division of the above functional modules is only described as an example. In actual applications, the above functions may be allocated by different functional modules according to actual needs. That is, the content structure of the apparatus may be divided into different functional modules to complete all or part of the functions described above.

Regarding the apparatus in the above embodiment, the specific manner in which each module performs operations has been described in detail in the embodiments of the method, and will not be described in detail here.

An exemplary embodiment of the disclosure further provides a data transmission device for FBE, which can implement the data transmission method for FBE provided by the disclosure. The device can be applied to the second access network device described above. The device may include a processor and a memory for storing instructions executable by the processor. The processor can be configured to receive transmission status indication information sent by a first access network device. The transmission status indication information includes beam occupation information and cycle occupation information, the beam occupation information is used for indicating a first beam occupied for transmitting first data between the first access network device and a first terminal, and the cycle occupation information is used for indicating a fixed cycle occupied for transmitting the first data. The processor can be further configured to determine a second beam having a mutually exclusive interference relationship with the first beam, determine, when the second access network device needs to perform transmission of second data with a second terminal by using the second beam, a fixed cycle occupied by the second data based on the fixed cycle occupied by the first data, and perform transmission of the second data with the second terminal in the fixed cycle occupied by the second data.

Optionally, the processor is configured to select a fixed cycle not overlapping with the fixed cycle occupied by the first data as the fixed cycle occupied by the second data.

Optionally, the processor can be configured to select, for uplink data in the second data, a fixed cycle meeting a first condition as the fixed cycle occupied by the uplink data in the second data, the first condition including that there is no overlap with the fixed cycle occupied by the first data, and select, for downlink data in the second data, a fixed cycle meeting a second condition as the fixed cycle occupied by the downlink data in the second data, the second condition including that there is no overlap with a fixed cycle occupied by uplink data in the first data.

Additionally, the processor can be further configured to select, when the second data belongs to a specified type of service data and needs to occupy a conflict fixed cycle for transmission, in the conflict fixed cycle a frequency domain resource, without overlapping a frequency domain resource occupied by the first data, for transmission of the second data. The conflict fixed cycle refers to a fixed cycle having an interference conflict with the fixed cycle occupied by the first data.

Optionally, the transmission status indication information further includes FBE indication information, and the FBE indication information is used for indicating a scheduling mechanism used by the first access network device for transmission of the first data is an FBE scheduling mechanism.

Optionally, the transmission status indication information further includes frequency domain indication information, and the frequency domain indication information is used for indicating a frequency domain resource occupied by transmission of the first data.

Optionally, the transmission status indication information further includes transmission type indication information, and the transmission type indication information is used for indicating a transmission type corresponding to the first data, the transmission type including uplink transmission or downlink transmission.

Optionally, the processor is further configured to, when the transmission type corresponding to the first data includes the uplink transmission, determine the second beam having the mutually exclusive interference relationship with the first beam.

Optionally, the processor is configured to determine the second beam having the mutually exclusive interference relationship with the first beam according to pre-stored mutually exclusive interference information. The mutually exclusive interference information includes a mutually exclusive interference relationship among at least one group of beams.

The processor can be further configured to receive, when measurement signal is sent by the first access network device using a first target beam, the measurement signal by using a second target beam, and obtain a received signal strength of the measurement signal, determine, when the received signal strength of the measurement signal is greater than a preset threshold, there is the mutually exclusive interference relationship between the second target beam and the first target beam, and record the mutually exclusive interference relationship between the second target beam and the first target beam.

Optionally, the processor can be further configured to determine, according to at least one group of beams determined as having the mutually exclusive interference relationship, a beam distribution of the second access network device, and a beam distribution of the first access network device, at least one group of other beams having the mutually exclusive interference relationship between the second access network device and the first access network device.

The above mainly describes the solutions provided by the embodiments of the disclosure from the perspective of the access network device. It should be understood that, in order to implement the foregoing functions, the access network device includes a hardware structure and/or a software module corresponding to each function. With reference to the units and algorithm steps of each example described in the embodiments of the disclosure, the embodiments can be implemented in the form of hardware or a combination of hardware and computer software. Whether a certain function is performed by hardware or computer software-driven hardware depends on the specific application of the technical solution and design constraints. Those skilled in the art may use different methods to implement the described functions for each specific application, but such implementation should not be considered to go beyond the scope of the technical solutions of the embodiments of the disclosure.

Figure 7:
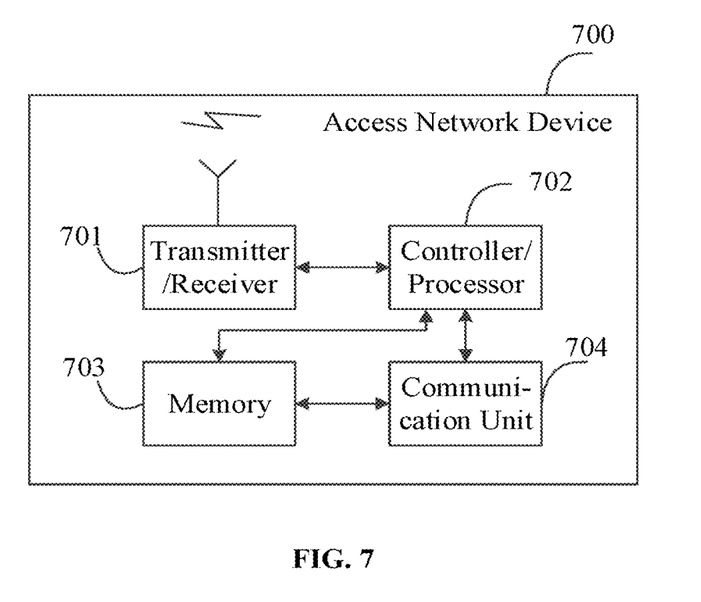
FIG. 7 is a schematic structural diagram illustrating an access network device according to an exemplary embodiment.

FIG. 7 is a schematic structural diagram illustrating an access network device according to an exemplary embodiment.

The access network device 700 includes a transmitter/receiver 701 and a processor 702. The processor 702 may also be a controller, which is shown as "controller/processor 702" in FIG. 7. The transmitter/receiver 701 is configured to support receiving and sending information between the access network device and the terminal in the foregoing embodiments, and to support communication between the access network device and other network entities. The processor 702 performs various functions for communicating with the terminal. As to the uplink, the uplink signal from the terminal is received via an antenna, demodulated by the receiver 701 (for example, demodulating a high-frequency signal into a baseband signal), and further processed by the processor 702 to restore service data and signaling information sent by the terminal. As to the downlink, the service data and signaling information are processed by the processor 702 and modulated by the transmitter 701 (for example, the baseband signal is modulated into a high-frequency signal) to generate a downlink signal and transmitted to the terminal via the antenna. It should be noted that the above-mentioned demodulation or modulation function may also be completed by the processor 702. For example, the processor 702 is further configured to execute each step of the access network device in the foregoing method embodiments, and/or other steps of the technical solution described in the embodiments of the disclosure.

Further, the access network device 700 may further include a memory 703, where the memory 703 is configured to store program code and data of the access network device 700. In addition, the access network device may further include a communication unit 704. The communication unit 704 is configured to support communication between the access network device and other network entities (such as a network device in a core network). For example, in the LTE system, the communication unit 704 may be an S1-U interface for supporting the access network device to communicate with a serving gateway (S-GW). Optionally, the communication unit 704 may also be an S1-MME interface for supporting communication between the access network device and a mobility management entity (MME).

It can be understood that FIG. 7 only shows a simplified design of the access network device 700. In practical applications, the access network device 700 may include any number of transmitters, receivers, processors, controllers, memories, communication units, an the like, and all access network devices that can implement the embodiments of the disclosure should fall within the protection scope of the embodiments.

An embodiment of the disclosure also provides a non-transitory computer-readable storage medium on which a computer program is stored, and the computer program implements the steps of the above-mentioned data transmission method for FBE when being executed by a processor of the access network device.

It should be understood that "a plurality" mentioned herein means two or more. The term "and/or" describes the association relationship of the associated objects, and indicates that there may be three kinds of relationships. For example, A and/or B may refer to three cases: A exists alone, A and B exist, and B exists alone. The character "/" generally indicates that the related objects are in an "or" relationship.

Those skilled in the art will readily contemplate other embodiments of the disclosure after considering the specification and practicing the disclosure herein. This application is intended to cover any variations, uses, or adaptations of this disclosure that conform to the general principles of the disclosure and include the common general knowledge or conventional technical means in the technical field not disclosed by this disclosure. It is intended that the specification and examples should be considered as exemplary only, with a true scope and spirit of the disclosure being indicated by the appending claims.

It should be understood that the disclosure is not limited to the precise structure that has been described above and illustrated in the accompanying drawings, and various modifications and changes may be made without departing from the scope thereof. The scope of the disclosure is limited only by the appending claims.

What is claimed is:

1. A data transmission method for a frame based equipment (FBE) that is performed by a second access network device, comprising:
receiving transmission status indication information sent by a first access network device, the transmission status indication information including beam occupation information and cycle occupation information, where the beam occupation information is used for indicating a first beam occupied for transmitting first data between the first access network device and a first terminal, and the cycle occupation information is used for indicating a fixed cycle occupied for transmitting the first data;
determining a second beam having a mutually exclusive interference relationship with the first beam;
determining a fixed cycle occupied by second data based on the fixed cycle occupied by the first data when the second access network device needs to perform transmission of the second data with a second terminal by using the second beam; and
performing transmission of the second data with the second terminal in the fixed cycle occupied by the second data.

2. The method according to claim 1, wherein the determining the fixed cycle further comprises:
selecting a fixed cycle that is not overlapping with the fixed cycle occupied by the first data as the fixed cycle occupied by the second data.

3. The method according to claim 1, wherein the determining the fixed cycle further comprises:
selecting for uplink data in the second data, a fixed cycle meeting a first condition as the fixed cycle occupied by the uplink data in the second data, where the first condition includes that there is no overlap with the fixed cycle occupied by the first data; and
selecting for downlink data in the second data, a fixed cycle meeting a second condition as the fixed cycle occupied by the downlink data in the second data, where the second condition includes that there is no overlap with a fixed cycle occupied by uplink data in the first data.

4. The method according to claim 1, further comprising:
selecting in a conflict fixed cycle a frequency domain resource, without overlapping a frequency domain resource occupied by the first data, for transmission of the second data when the second data belongs to a specified type of service data and needs to occupy the conflict fixed cycle for transmission,
wherein the conflict fixed cycle refers to a fixed cycle having an interference conflict with the fixed cycle occupied by the first data.

5. The method according to claim 1, wherein the transmission status indication information further includes FBE indication information that is used for indicating a scheduling mechanism used by the first access network device for transmission of the first data is an FBE scheduling mechanism.

6. The method according to claim 1, wherein the transmission status indication information further includes frequency domain indication information that is used for indicating a frequency domain resource occupied by transmission of the first data.

7. The method according to claim 1, wherein the transmission status indication information further includes transmission type indication information that is used for indicating a transmission type corresponding to the first data, the transmission type including uplink transmission or downlink transmission.

8. The method according to claim 7, further comprising:
performing the determining of the second beam having the mutually exclusive interference relationship with the first beam when the transmission type corresponding to the first data includes the uplink transmission.

9. The method according to claim 1, wherein the determining the second beam having the mutually exclusive interference relationship with the first beam further comprises:
determining the second beam having the mutually exclusive interference relationship with the first beam based on pre-stored mutually exclusive interference information,
wherein the mutually exclusive interference information includes a mutually exclusive interference relationship among at least one group of beams.

10. The method according to claim 9, further comprising:
receiving a measurement signal by using a second target beam when the measurement signal is sent by the first access network device using a first target beam, and obtaining a received signal strength of the measurement signal; and
determining there is the mutually exclusive interference relationship between the second target beam and the first target beam when the received signal strength of the measurement signal is greater than a preset threshold; and
recording the mutually exclusive interference relationship between the second target beam and the first target beam.

11. The method according to claim 10, further comprising:
determining a beam distribution of the second access network device based on at least one group of beams determined as having the mutually exclusive interference relationship, and a beam distribution of the first access network device, at least one group of other beams having the mutually exclusive interference relationship between the second access network device and the first access network device.

12. A data transmission device for a frame based equipment (FBE) that is applied to a second access network device, the data transmission device comprising:
a processor; and
a memory that is configured to store instructions executable by the processor,
wherein the processor is configured to:
receive transmission status indication information sent by a first access network device, the transmission status indication information including beam occupation information and cycle occupation information, where the beam occupation information is used for indicating a first beam occupied for transmitting first data between the first access network device and a first terminal, and the cycle occupation information is used for indicating a fixed cycle occupied for transmitting the first data;

determine a second beam having a mutually exclusive interference relationship with the first beam;

determine a fixed cycle occupied by second data based on the fixed cycle occupied by the first data when the second access network device needs to perform transmission of the second data with a second terminal by using the second beam; and perform transmission of the second data with the second terminal in the fixed cycle occupied by the second data.

13. The device according to claim 12, wherein the processor is further configured to:

select a fixed cycle that is not overlapping with the fixed cycle occupied by the first data as the fixed cycle occupied by the second data; or select, for uplink data in the second data, a fixed cycle meeting a first condition as the fixed cycle occupied by the uplink data in the second data, the first condition including that there is no overlap with the fixed cycle occupied by the first data, and select, for downlink data in the second data, a fixed cycle meeting a second condition as the fixed cycle occupied by the downlink data in the second data, the second condition including that there is no overlap with a fixed cycle occupied by uplink data in the first data.

14. The device according to claim 12, wherein the processor is further configured to:

select in a conflict fixed cycle a frequency domain resource, without overlapping a frequency domain resource occupied by the first data, for transmission of the second data when the second data belongs to a specified type of service data and needs to occupy the conflict fixed cycle for transmission, wherein the conflict fixed cycle refers to a fixed cycle having an interference conflict with the fixed cycle occupied by the first data.

15. The device according to claim 12, wherein the transmission status indication information further comprises at least one of:

FBE indication information that is used for indicating a scheduling mechanism used by the first access network device for transmission of the first data is an FBE scheduling mechanism;

frequency domain indication information that is used for indicating a frequency domain resource occupied by transmission of the first data; or transmission type indication information that is used for indicating a transmission type corresponding to the first data, the transmission type including uplink transmission or downlink transmission.

16. The device according to claim 15, wherein the processor is further configured to:

perform the determining of the second beam having the mutually exclusive interference relationship with the first beam when the transmission type corresponding to the first data includes the uplink transmission.

17. The device according to claim 12, wherein the processor is configured to:

determine the second beam having the mutually exclusive interference relationship with the first beam according to pre-stored mutually exclusive interference information;

wherein the mutually exclusive interference information includes a mutually exclusive interference relationship among at least one group of beams.

18. The device according to claimer 17, wherein the processor is further configured to:

receive a measurement signal by using a second target beam when the measurement signal is sent by the first access network device using a first target beam, and obtaining a received signal strength of the measurement signal;

determine there is the mutually exclusive interference relationship between the second target beam and the first target beam when the received signal strength of the measurement signal is greater than a preset threshold; and record the mutually exclusive interference relationship between the second target beam and the first target beam.

19. The device according to claim 18, wherein the processor is further configured to:

determine a beam distribution of the second access network device based on at least one group of beams determined as having the mutually exclusive interference relationship, and a beam distribution of the first access network device, at least one group of other beams having the mutually exclusive interference relationship between the second access network device and the first access network device.

20. A non-transitory computer-readable storage medium that is configured to store a computer program thereon that, when executed by a processor of a second access network device, causes the processor to perform a data transmission method for a frame based equipment (FBE), the method comprising:

receiving transmission status indication information sent by a first access network device, the transmission status indication information including beam occupation information and cycle occupation information, where the beam occupation information is used for indicating a first beam occupied for transmitting first data between the first access network device and a first terminal, and the cycle occupation information is used for indicating a fixed cycle occupied for transmitting the first data;

determining a second beam having a mutually exclusive interference relationship with the first beam;

determining a fixed cycle occupied by second data based on the fixed cycle occupied by the first data when the second access network device needs to perform transmission of the second data with a second terminal by using the second beam; and performing transmission of the second data with the second terminal in the fixed cycle occupied by the second data.

* * * * *

UNITED STATES PATENT AND TRADEMARK OFFICE
CERTIFICATE OF CORRECTION

PATENT NO. : 11,882,583 B2  
APPLICATION NO. : 17/267203  
DATED : January 23, 2024  
INVENTOR(S) : Juejia Zhou Page 1 of 1

It is certified that error appears in the above-identified patent and that said Letters Patent is hereby corrected as shown below:

On the Title Page

Item (73) should read:  
-- (73) Assignee: Beijing Xiaomi Mobile Software Co., Ltd., Beijing (CN) --

Signed and Sealed this  
Twenty-fourth Day of June, 2025

Coke Morgan Stewart  
*Acting Director of the United States Patent and Trademark Office*